UNITED STATES PATENT OFFICE.

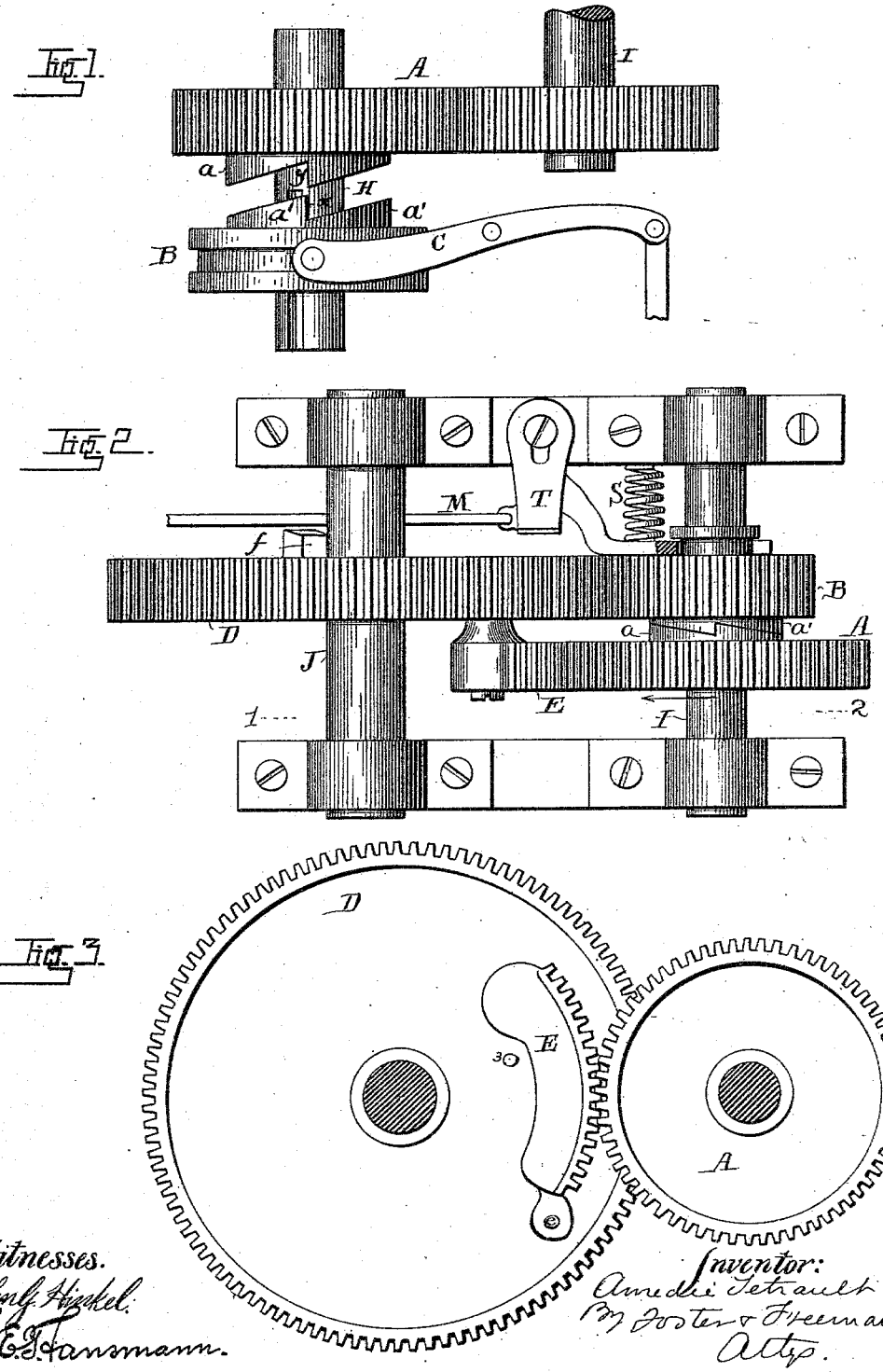

AMÉDÉE TÉTRAULT, OF MIAMISBURG, OHIO, ASSIGNOR TO ABEL HOOVER AND WILLIAM GAMBLE, OF SAME PLACE.

CLUTCH DEVICE.

SPECIFICATION forming part of Letters Patent No. 303,071, dated August 5, 1884.

Application filed January 9, 1884. (No model.)

*To all whom it may concern:*

Be it known that I, AMÉDÉE TÉTRAULT, of Miamisburg, Montgomery county, Ohio, have invented certain Improvements in Clutch Devices, of which the following is a specification.

My invention relates to that class of devices employed for connecting and disconnecting machines or parts thereof with and from a constantly-moving driving-shaft, the object of my invention being to prevent the sudden shocks usually resulting when the connection is made or broken; and my invention consists in means, fully described hereinafter, whereby to relieve the clutch from pressure prior to separating the parts thereof.

In the drawings, Figure 1 is a plan view illustrating a clutch device of the usual construction. Fig. 2 is a plan of my improved clutch device. Fig. 3 is a sectional elevation on the line 1 2, Fig. 1.

In many classes of machinery—as printing-presses, grain-binders, lathes for turning irregular forms, looms, &c.—where it is necessary to automatically and periodically throw part of the mechanism into and out of operation by making and breaking connection with a constantly-rotating driving-shaft, it is common to employ clutch devices similar in character to that shown in Fig. 1, in which the pinion A, driven from a wheel on the driving-shaft I, is loose on the driving-shaft H, carrying a clutch-wheel, B, having teeth $a'$, engaging with teeth $a$ on the wheel A when the pinion is brought toward the wheel by a lever, C, operated from some moving part of the machine or by hand. All such devices are objectionable in many cases because of the sudden jars in connecting and disconnecting the clutch and of the friction and wear that result from sliding upon each other of the two parts of the clutch when the faces $x\,y$ of the teeth are in close frictional contact. To avoid these objections I employ means whereby to withdraw the faces $x\,y$ from contact prior to laterally removing one part of the clutch from the other by imparting a positive rotation to one part of the clutch device in the same direction as the other, but at a slightly greater speed, and then shifting it after the pressure on the faces has been relieved.

Different means may obviously be employed for driving one part of the clutch temporarily at a greater speed. I have found those illustrated in Figs. 2 and 3 to be effective. In said figures, I is the driving-shaft, carrying a fixed pinion, A, and a loose pinion, B, the latter being in constant gear with the teeth of a cog-wheel, D, on the shaft I, to which intermittent rotation is to be imparted. The pinions A B are provided with clutch-teeth $a\,a'$, arranged, as shown, so that the rotation of the shaft I and pinion A in the direction of the arrow is the means of driving positively the pinion B in the same direction and of revolving the shaft J.

It will be apparent that if at any time the wheel D is driven, by other means than the pinion B, in the same direction as before, but at a slightly greater speed than that at which the pinion revolves, the inclined faces of the teeth $a'$ will ride upon those of the teeth $a$, and the pinion B will be carried laterally away from the pinion A until the teeth $a\,a'$ are free from contact. My invention consists in effecting this result. One of the different means which may be employed is shown, and it consists in providing the wheel D with a curved rack-bar, E, preferably pivoted to a pin, $c$, so as to engage easily with the teeth of the pinion A as the bar is brought into position by the revolution of the wheel. As soon as this engagement occurs the wheel D will be driven in the same direction as before, but the pinion A becomes the driver instead of the pinion B; and as the pinion A is largest in diameter and the curve of the rack-bar is less than that of the wheel D, the speed of the latter will be slightly increased, and the pinion B will be driven from the wheel at a speed slightly greater than that of the pinion A, so that the teeth $a'$ will move upon the teeth $a$. I thus secure the easy and gradual separation of the clutch-teeth, and carry one part, B, of the clutch away from the other, A, and the two parts of the clutch are separated without any grinding of one face under pressure upon the other. After the rack E passes from the pinion A the movement of the wheel D ceases, and the pivoted rack drops away from the pinion, preventing the knocking of the teeth and the jars and noise resulting therefrom, a pin, 3, limiting the movement of the rack.

A spring, S, bears upon a forked arm S', that engages with the hub of the pinion B, and would force the latter back toward the pinion A after the rack E passes from the pinion A, if not held by a detent. Any suitable detent may be used. That shown consists of a sliding and vibrating stop-finger, T, carrying the arm S', and arranged to be struck by a lug, f, on the wheel D, just as the rack E leaves the pinion A, thereby arresting the motion of the wheel D and preventing the pinion B from moving back. I thus hold the two parts of the clutch out of contact and prevent the noise and shocks usually resulting in clutch devices.

It is immaterial whether the pinion A be driven from the shaft I or from a separate shaft moved by the driving-shaft, or whether it engages with a segment-pinion on the shaft I; or other means of temporarily driving the latter independently of the pinion B may be used.

The construction of the arresting-means is not important, provided the pinion B is held in place after the teeth a' pass from contact with the teeth a.

The stop-finger T is controlled by hand, or by some moving part of the machine depending upon its character, so as to be thrown from contact with the lug f when the motion of the shaft I is to be resumed, when the spring S will throw the clutches together. Thus a rod, M, throws the finger to one side, when the wheel D will be released. The pinion will then slide laterally under the action of the spring S until the teeth a a' are in contact, when the wheel will be driven by the pinion B, as before.

As the pinions A B differ but slightly in diameter, there is no perceptible shock resulting from the slight change in speed, when one or the other becomes the driving-pinion.

It will be obvious that any character of clutch-teeth may be used.

I claim—

1. In a clutch device, a loose driving-pinion, B, gearing with the driving-wheel D, and provided with clutch-teeth a', in combination with the driving-pinion A, provided with clutch teeth a, and means whereby the pinion A is at intervals geared with the shaft of the wheel D, to impart to the latter a motion in excess of that of the pinion B, substantially as described.

2. The combination, with the clutch-teeth—one carried by a loose and the other by a tight pinion upon the shaft H—and with the wheel gearing with the loose pinion, of means for temporarily driving the said wheel at a greater speed, to move one part of the clutch from the other, and a stop device for holding the movable part of the clutch in the position to which it is moved, substantially as set forth.

3. The combination of the two-part clutch, and means for driving one part at a greater speed than the other to separate them, a detent for holding the moved part in the position to which it is set, and a spring for restoring it to its place when the detent is moved, substantially as set forth.

4. The combination, with the clutch-gear and the wheel driven thereby, of independent means for intermittently driving the said wheel positively at an increased speed, and a catch device to hold the clutch, and means for operating the same from said wheel, substantially as set forth.

5. The combination of the pinions A B, having engaging-teeth a a', a spring arranged to carry the pinions toward each other, the driver-wheel D, carrying a rack, E, a catch or detent for holding the pinion B in its position after it has been moved, and releasing means, substantially as described.

6. The combination, with the driving-pinion and the wheel to be driven intermittently, of a rack adapted to engage with the driving-pinion, and pivoted to fall back as it passes from the same, for the purpose specified.

In testimony whereof I have signed my name to this specification in the presence of two subscribing witnesses.

AMÉDÉE TÉTRAULT.

Witnesses:
CHARLES E. FOSTER,
LEWIS H. ZEHRING.